United States Patent [19]

Kitamura et al.

[11] Patent Number: 4,683,500

[45] Date of Patent: Jul. 28, 1987

[54] METHOD FOR REPRODUCING PICTURE IMAGE

[75] Inventors: Hideaki Kitamura, Osaka; Syogo Fujiki; Mitsuhiko Yamada, both of Kyoto, all of Japan

[73] Assignee: Dainippon Screen Mfg. Co., Ltd., Japan

[21] Appl. No.: 791,331

[22] Filed: Oct. 25, 1985

[30] Foreign Application Priority Data

Dec. 25, 1984 [JP] Japan .................................. 59-272003

[51] Int. Cl.$^4$ ........................................... H04N 1/387
[52] U.S. Cl. ...................................... 358/280; 358/78
[58] Field of Search .................. 358/256, 257, 78, 280

[56] References Cited

U.S. PATENT DOCUMENTS

| 3,819,854 | 6/1974 | Kolb | 358/78 |
| 4,338,636 | 7/1982 | Yamada | 358/256 |
| 4,538,182 | 8/1985 | Saito | 358/257 |

Primary Examiner—Howard W. Britton
Attorney, Agent, or Firm—Ostrolenk, Faber, Gerb & Soffen

[57] ABSTRACT

A method for reproducing picture images in which a plurality of original pictures are recorded on a recording surface of a picture scanning recording machine according to a predetermined layout comprising the steps of inputting data for configurations and dispositions of more than one closed contour in accordance with the predetermined layout and picture data to be recorded in the insides of the closed contours by a data inputting device, converting the input configuration and disposition data into closed contour data which are rearranged in the order of having been recorded on the recording surface of the machine, storing in memory these data together with picture data to be recorded inside the closed contours reading the two kinds of data out of the data memory according to the order recorded on the recording surface of the machine, and recording a picture signal or a tint screen which is output from the picture scanning input in accordance with the data inside of more than one closed contour.

3 Claims, 12 Drawing Figures

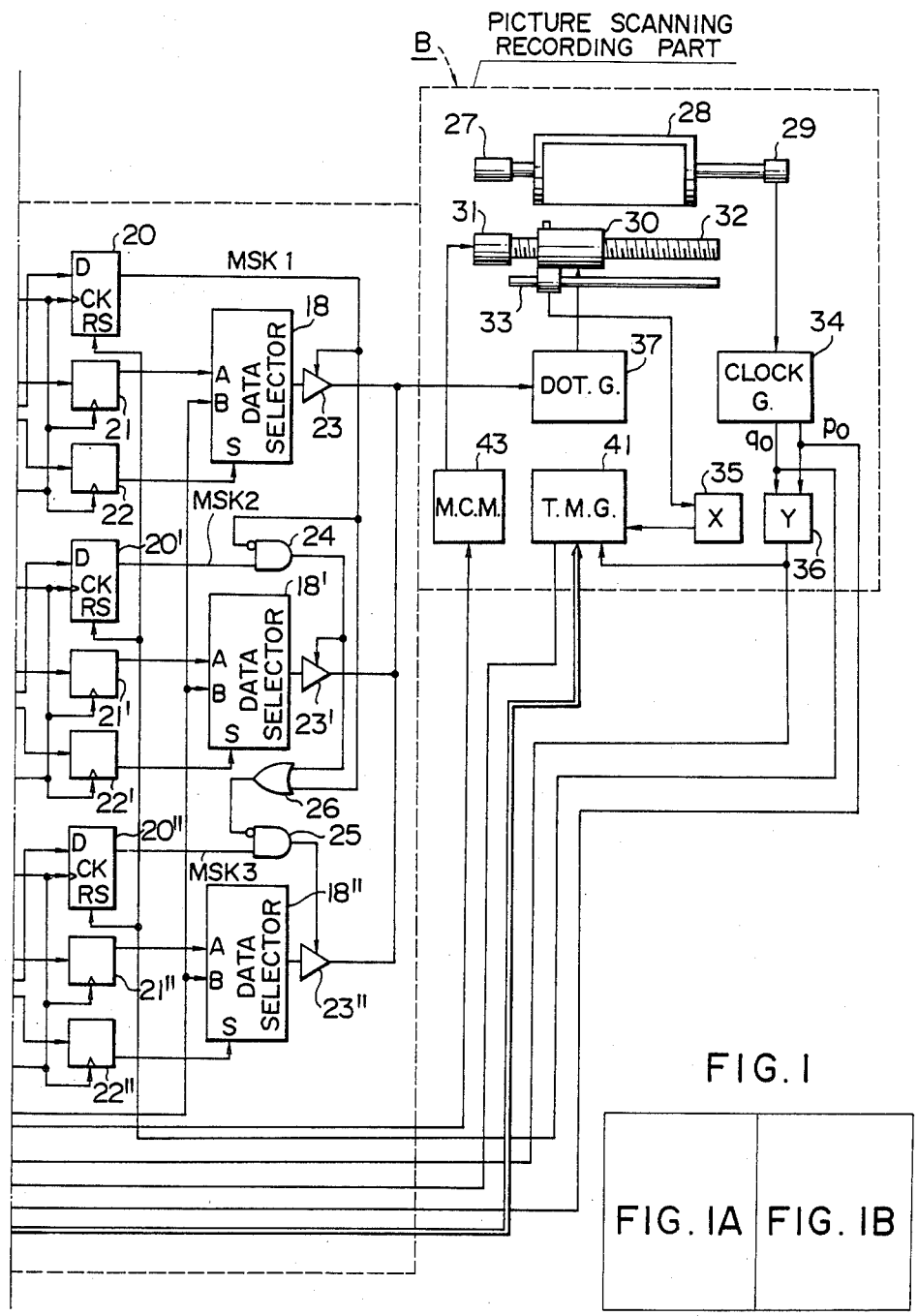
FIG. IB
FIG. I
| FIG. IA | FIG. IB |

FIG. IA
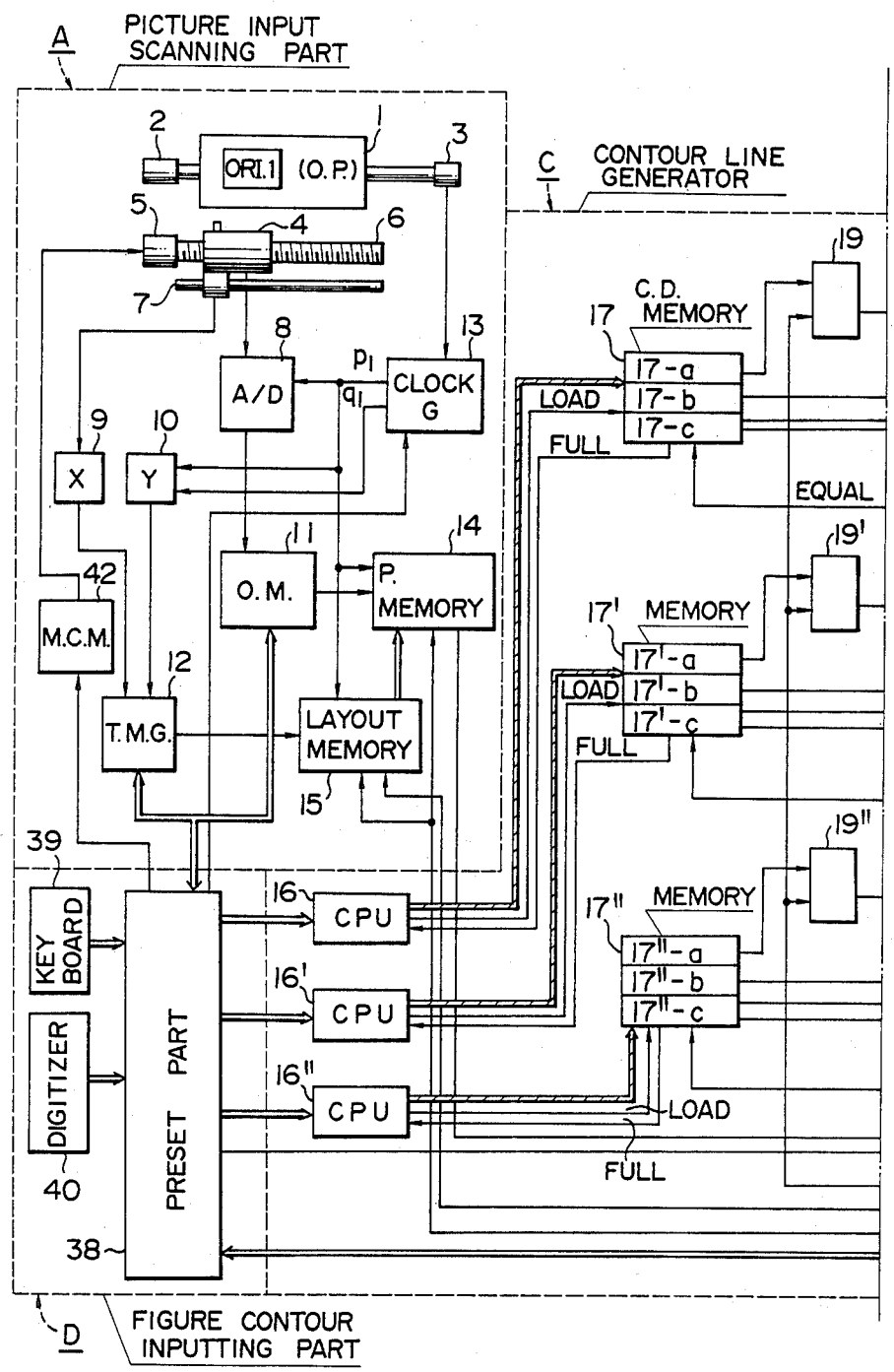

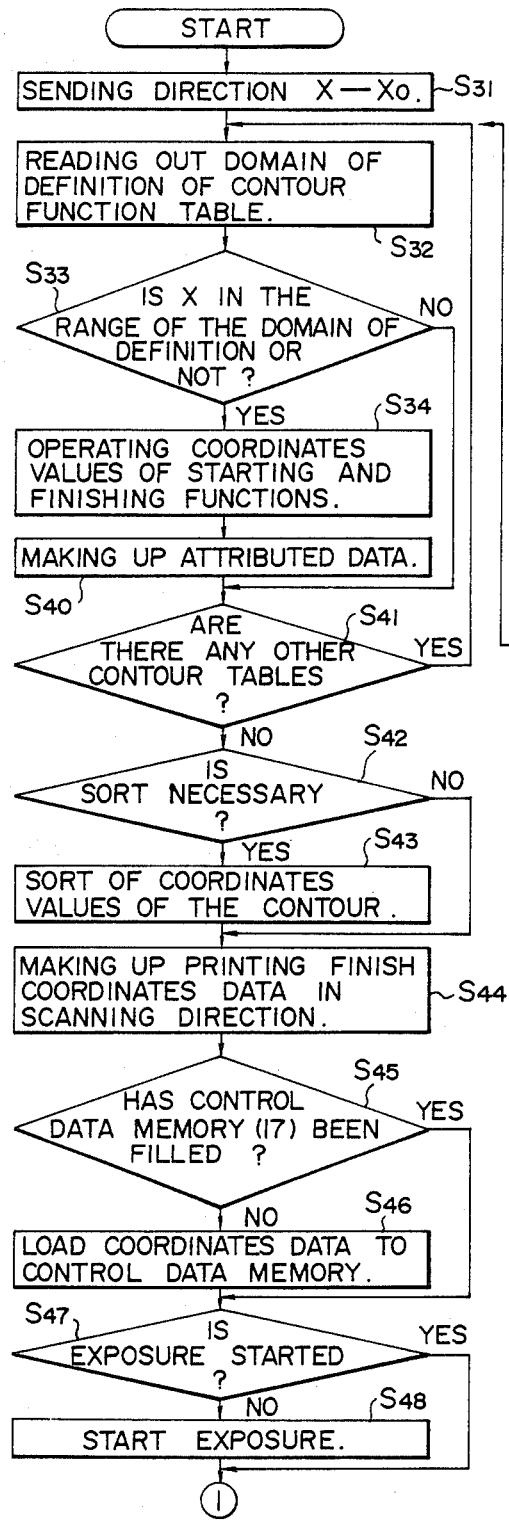
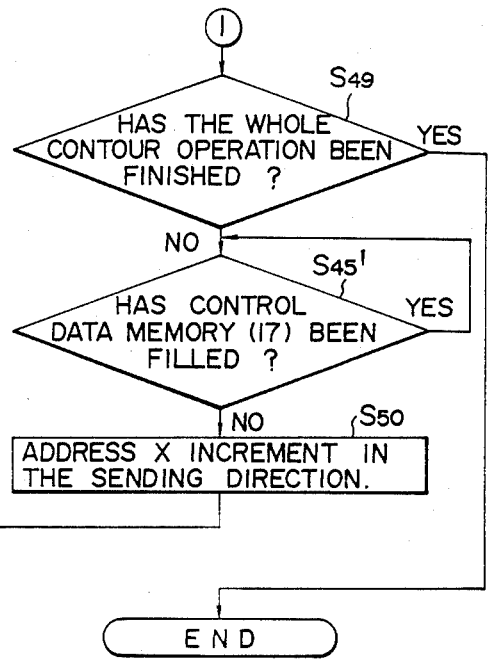
FIG. 4

Xs

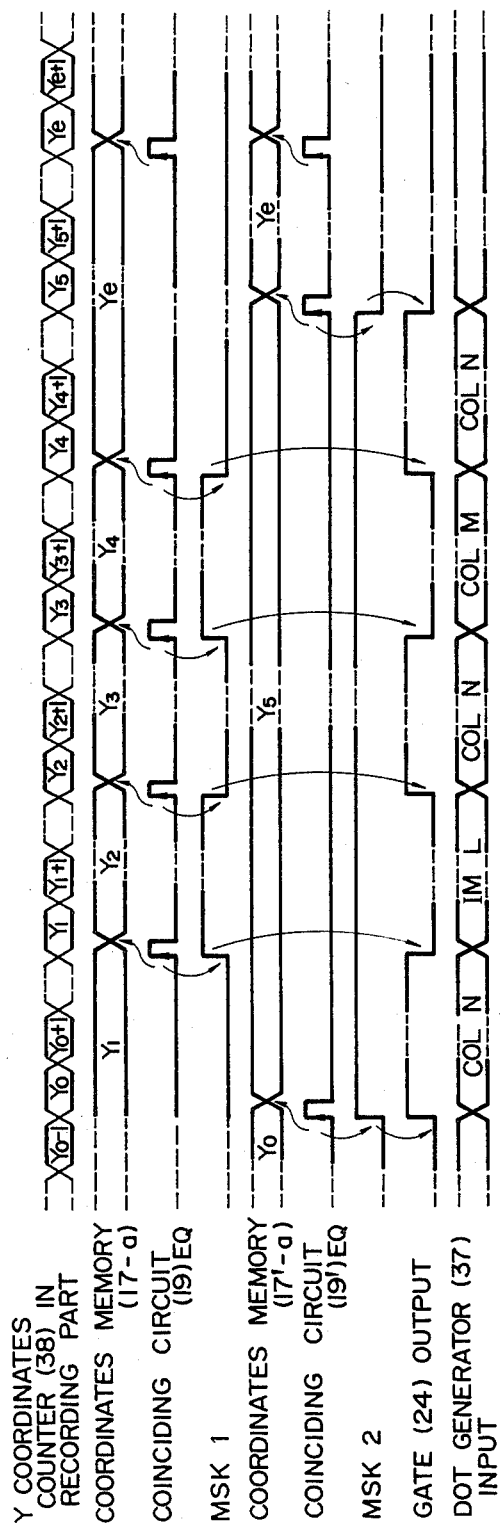

METHOD FOR REPRODUCING PICTURE IMAGE

BACKGROUND OF THE INVENTION

The present invention relates to a picture scanning recording control method applied in a picture scanning recording machine such as a color scanner etc. in which a plurality of original pictures stuck on an original picture cylinder are photoelectrically scanned to reproductively record each of reproduced picture images corresponding to the respective original pictures, for example, on each of desired positions of an output film stuck onto a recording cylinder with desired contour (trimming line, that is, circumferential line of a trimmed area, hereinafter refer to "contour").

DESCRIPTION OF THE PRIOR ART

The present Applicant have already disclosed in the Japanese Patent Laid-Open Publication Nos. 57-195249 and 56-31273 regarding a picture scanning recording control machine which is, for the purpose of recording reproduction pictures according to contours and outputting positions previously indicated to a plurality of original pictures which are wound and stuck on a picture scanning inputting machine adapted to be able to record all the reproduced pictures onto desired positions of an output film with desired contours immediately in real time, by controlling movements of a scanning head and a recording head to coincide with each of the record starting points of each of the plurality of the original pictures with respective record starting points on an output film corresponding to each of the starting points.

In addition, the present Applicant has filed a Japanese Patent Application No. 58-157236 in which an invention for an editing machine of reproduced pictures which can process plate collecting workings such as cropping, bordering, tint screen masking (or flat tint screen maksing), cut masking etc. in real time.

In the above described Japanese Patent Laid-Open Publications and the specification of the patent application there have been disclosed techniques for controlling scanning record of reproduced pictures in which reproduced pictures of which contours can be expressed by a formula(s) such as a circle(s), and ellipse(s), a polygon(s) etc. and tint laying can be exposed. However, there is no disclosure regarding any technique by which contour processing based on any given figures can be achieved.

SUMMARY OF THE INVENTION

It is an object of the present invention to provide a novel picture scanning recording control method in which figure selecting instructions for contours of a circle(s), an ellipse(s), a polygon(s), any given figures etc., coordinate points for representing figures, instructions for selecting picture patterns and flat tint, preferential degree etc. are input to a picture scanning recording machine through input means such as a digitizer, a key board or the like, the input data are modified according to the selected figures, the modified data are input to a processing circuit in accordance with the preferential degree, in the processing circuit, based on the modified data, starting data of contour process according to sequence of scanning lines, finishing point data and selection instructing data of picture pattern/tint screen are output in coincidence with scanning records by carrying our operational processing, and in the case of selecting the tint, screen tint data are output in coincidence with scanning records by carrying out operational processing, and according to the preferential degree of the processing circuit to select either picture signal or tint screen signal, the selected signal is controlled so as to be recorded.

According to the present invention figures are processed in applying coordinate system by inputting data of the figure, picture patterns/tint screen selection, the preferential degree etc. through an input means, and each of the starting coordinate points and the finishing coordinate points according to sequence of the scanning lines at every figure are output together with the picture patterns and the tint screen data, and designated figure, picture patterns and tint screen are selected to be reproductively recorded according to the preferential degree.

BRIEF DESCRIPTION OF THE DRAWINGS

FIG. 1 which is divided into two figures, FIG. 1A and FIG. 1B is a block diagram of a picture reproducing machine showing an example of construction which practices the present invention;

FIG. 4 is a flow chart showing one example of contour coordinate operating processing carried out in the CPU;

FIG. 6 is a timing chart in the case of outputting contours different in their preferential degrees at the block C shown in FIG. 1;

DETAILED DESCRIPTION OF THE INVENTION AND PREFERRED EMBODIMENT

Figure 2:
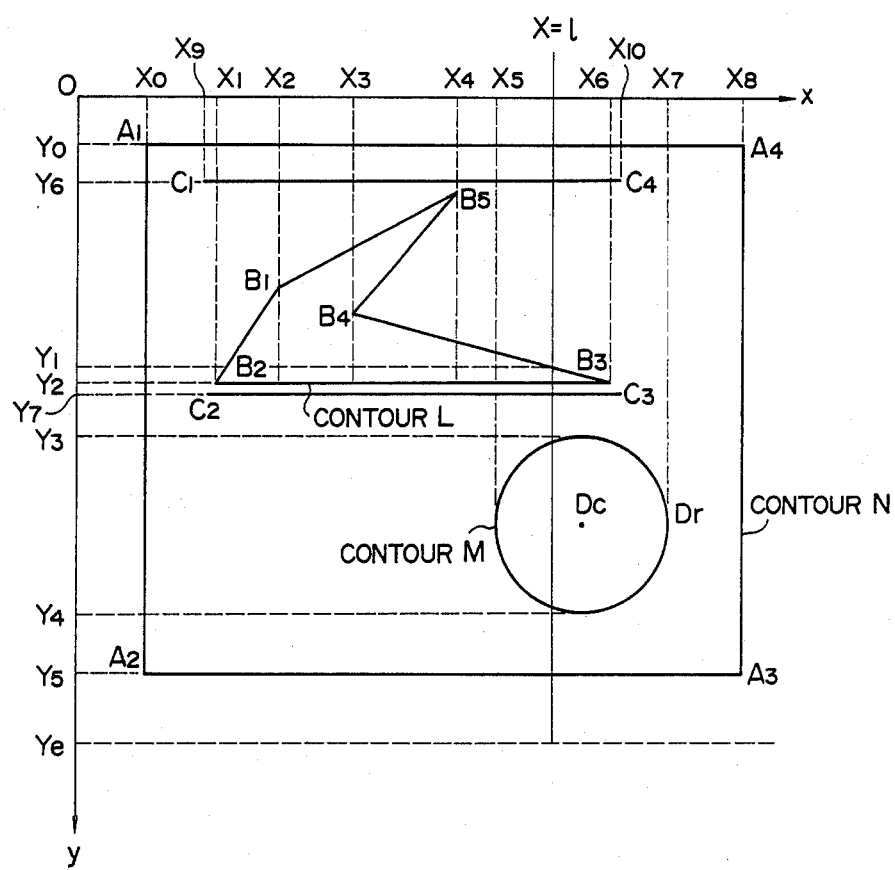
FIG. 2 is a view showing concrete examples of contours of reproduced pictures for illustrating the gist of practicing the method according to the present invention.

In FIG. 1 there is shown an exmaple of a picture scanning recording machine which carries out recording contours of definite figures represented by such as a circle, an ellipse and a polygon etc., picture patterns having free shaped contours and tint screen in the present invention. In FIG. 1 block A indicates a picture scanning input part, block B indicates a picture scanning recording part, block C is a contour generating part of the present invention and block C indicates a figure contour inputting part.

Making up definite contour coordinates data:

Among the blocks shown in FIG. 1 the blocks A and B have been conventionally applied. With respect to the blocks A and B hereinafter brief descriptions will be given. In the block A an original picture(s) is wound and stuck onto the original picture cylinder 1 and the original picture cylinder 1 and a rotary encoder 3 are rotated coaxially by a driving motor 2. A scanning head 4 oppositely disposed to the original picture cylinder 1 scans the original pictures with a feeding screw 6 rotated by a driving motor 5. A linear encoder 7 outputs a pulse cooresponding to a scanning position of the original picture of the scanning head 4 to an X coordinate counter 9. A A/D converter 8 converts a picture signal having been photoelectrically converted by the scanning head 4 into a digital signal, according to a sampling pulse P which will be described hereinafter, and sends the digital signal to an operation means 11.

An output pulse of the rotary encoder 3 is input to a control clock generating means 13, the control clock generating means 13 outputs the sampling pulse $P_1$ which is inversely proportional to a set up magnification and a pulse $q_1$ which is generated at every one rotation of the original picture cylinder 1. The sampling pulse $P_1$ is input to the A/D converter 8, a Y coordinate counter 10, a memory means 14 and a layout memory control means. The pulse $q_1$ is input to the Y coordinate counter 10 in the embodiment in this figure.

To a trimming mask generating means 12 outputs from the X coordinate counter 9 and the Y coordinate counter 10 are input, and further coordinate data from a preset part 38 in the block D is also input to the trimming mask generating means 12. Thus, the trimming mask generating means 12 outputs an "H" signal, when the scanning head 4 is scanning an area which is designated by the preset part 38. A motor control means 42 controls the driving motor 5 so that an area designated by the preset part 38 may be scanned. The operation means 11 feeds picture signals having been operated for adjusting gradation and tone to the memory means 14, and a layout memory means 15 controls writing and reading of picture image data to the memory means 14 based upon various signals (will be described hereinafter) coming from the block B. A picture signal read out of the memory means 14 is input to a contour generating part C which will be described hereinafter.

Next, description will be given to the block B, that is, description with respect to the picture scanning recording part is given hereinafter.

An output recording film is wound and stuck onto a recording cylinder 28, and the recording cylinder 28 and a rotary encoder 29 are rotated coaxially with each other by a motor 27. A recording head 30 being oppositely disposed to the recording cylinder 28 scans and records a tint screen and a picture signal which are output from a dot generator 37 to the output film by means of a feeding screw 32 rotated by a driving motor 31.

A linear encoder 33 outputs a pulse generated according to scanning position of a recording film on the recording head to an X coordinate counter 35. An output pulse from the rotary encoder 29 is input to a control clock generating means 34. The control clock generating means 34 outputs a sampling $P_0$ and $q_0$ generated at every one rotation of the recording cylinder 28. The sampling pulse $P_0$ is input to a Y coordinate counter 36 and the block A. The pulse $q_0$ is input to the Y coordinate counter and the block C. An output of the X coordinate counter 35 is input to a trimming mask generating means 41.

To the trimming mask generating means 41 the output from the X coordinate counter 35, an output from the Y coordinate counter 36 and coordinate data from the preset part 38 of the block D are input, and when the recording head 30 scans an area which is designated by the preset part 38, the trimming mask generating means 41 outputs "H" signal. A motor control means 43 controls the driving motor 31 so that the designated area by the preset part 38 may be scanned by the recording head 30.

Next, descriptions with respect to the block D, the figure contour inputting part will be given hereinafter.

In the block D, the figures shown in FIG. 2 are, for example, drawn on a block copy base paper, and the block copy base paper is placed on a digitizer 40 which is in a cooresponding relation with the film wound on the recording cylinder 28 by coinciding the X axis of the former with that of the latter, and the Y axis of the former with that of the latter, respectively. To the digitizer 40, a stylus pen or a cursor (not shown) is attached, and by using it any given coordinate point on the digitizer 40 is fed to the preset part 38. Of course, coordinate points can be input by using a keyboard 39.

When coordinate points are fed to the preset 38, block D indicates whether the contour is a linear contour between those coordinate points and/or is a contour of a circle, an ellipse or the like, and further the digitizer or the keyboard indicates whether in the inside of the contour there is picture images or a tint screen.

In addition, when in the inside of the contour there is a picture image, the coordinate points on the original picture wound onto the original cylinder 1 are input to the present part 38. With respect to methods for performing the above, for example, it is very convenient to cite methods disclosed in the Japanese Patent Laid-Open Publication No. 56-3122, the Japanese Patent Application Nos. 58-157236 and 58-171622.

When the inside of the contour is the tint screen, halftone dot percent values of Y plate, M plate, C plate and K plate are input. Further, there is a case in which an electric (offprint), a special example of the tint screen, is input to the preset 38. In the case of a plurality of figures being partially overlapped, preferential degrees are also input to the preset 38.

In examples of the figures shown in FIG. 2, in the inside of a contour N shown by $A_1 A_2 A_3 A_4$, each of 10 percent tint screen of Y, M, C and K plates is input, in the inside of a contour L shown by $B_1 B_2 B_3 B_4 B_5$ a picture image is reproduced, and in the inside of a circular contour M of which radius is distance between $D_c$–$D_r$ and the center thereof is $D_c$, it is indicated to dispose 50 percent tint screen of each of Y plate, M plate, C plate and K plate. Of course, the picture image in the contour L and the tint screen in the contour M take precedence over that of the contour N.

Original picture signals of the original picture wound and stuck in the contour L on the original picture cylinder 1 is output from the memory means 14 corresponding to a contour shown by $C_1 C_2 C_3 C_4$, but in this example, by applying the method according to the present invention, the picture image only in the contour L can be reproduced.

Figure 3:
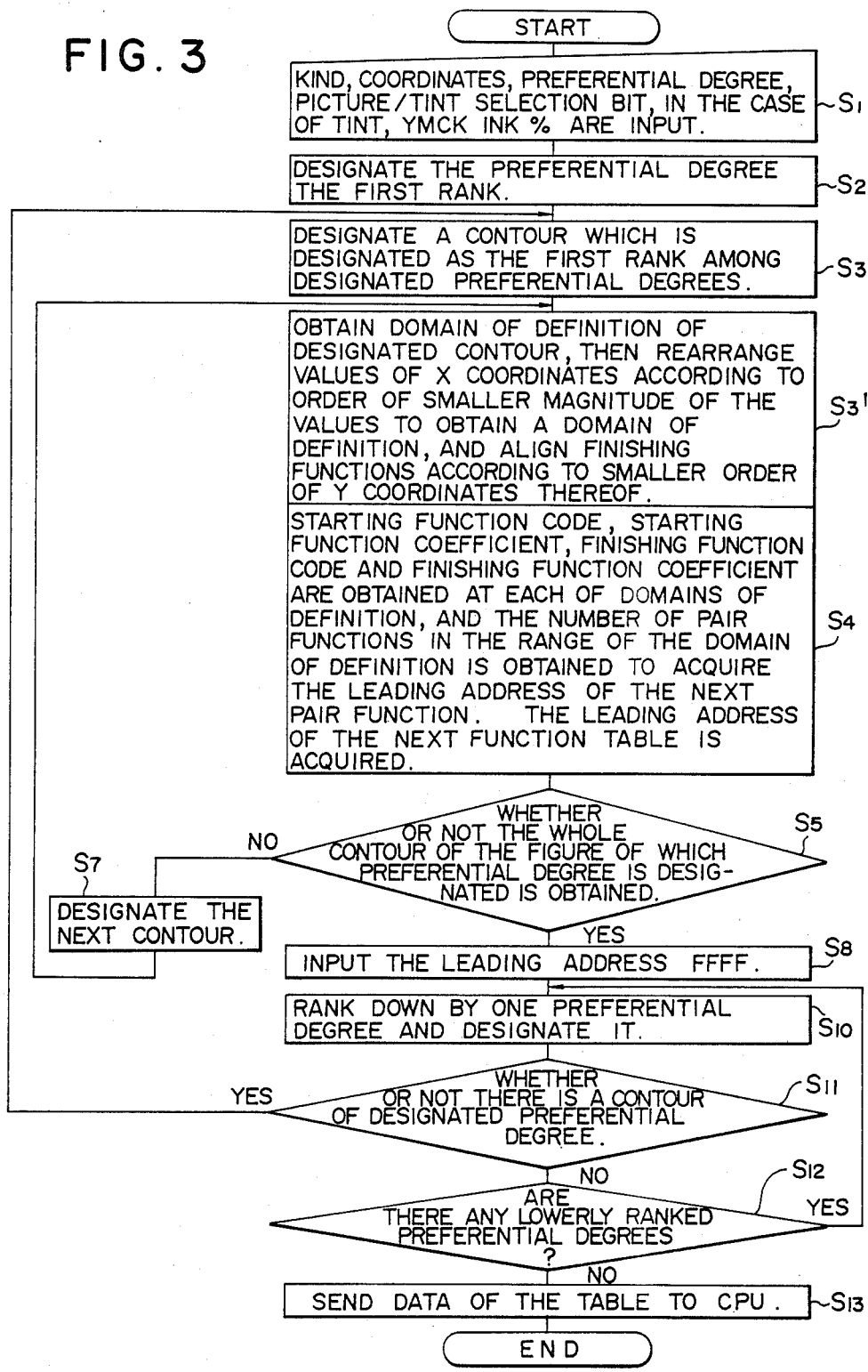
FIG. 3 is a flow chart for making a contour function table which is processed in a CPU at a preset portion of the picture reproducing machine.

Information input from the keyboard 39 and the digitizer 40 are transformed to those codes shown in Table 1 by CPU (central processing unit) in the inside of the preset part 38. FIG. 3 is a view showing processing flow of CPU in the inside of the preset part 38. At step $S_1$ kind of figures, coordinates, preferential degrees, pictures/tint screen selection bit are input to CPU of the preset part 38, and in case of applying a tint screen a percentage value of halftone dot of each of the color plates is input to CPU of the preset part 38.

In the example shown in FIG. 2, for the contour L the figure is polygon, and coordinate points $B_1$ $B_2$ $B_3$ $B_4$ $B_5$ are input from the digitizer 40. Then, a picture is selected according to the preferential degree as the most dominant factor over all other conditions, next, for the contour M a circle is selected and coordinate point $D_c$ of the center thereof and coordinates of a pint $D_r$ on the periphery of the circle are input by the digitizer 40 to CPU in the preset part, then by taking preferential degree as the most important factor the tint screen is selected. By designating each of halftone dot percent values of the respective color plates to be 50, then for the contour N a rectangular is selected as a figure to be input and the coordinate points $A_1$ $A_3$ are input to the CPU of the preset part 38 by the digitizer 40. By taking the preferential degree as the second rank, the tint screen is selected and halftone dot percent value of each of the color plates is determined as 10. Thus, when all necessary data of all the figures are input to CPU of the preset part 38, operation advances to the next stage of the flow chart.

At the step $S_2$, the preferential degree is designated to be ranked as the most important factor in the sequence of the following processing. At step $S_3$, the contour of the first preferential degree among the designated preferential degree is designated. In the example shown in FIG. 2 the contour of the first preferential degree is the contour L. At step $S_4$, at first domain of definition of the designated contour is obtained. In the examples shown in FIG. 2, coordinates $X_2$ $X_1$ $X_6$ $X_3$ $X_4$ of those coordinate points $B_1$ $B_2$ $B_3$ $B_4$ $B_5$ on X axis are rearranged so that they may be aligned in order of small coordinates, $X_1$ $X_2$ $X_3$ $X_4$ $X_5$ of X axis, and as domains of definition each of distances between $X_1$-$X_2$, $X_2$-$X_3$, $X_3$-$X_4$, $X_4$-$X_5$, is obtained.

Next, at the step $S_4$, starting function code, starting function coefficient, finishing function code and finishing function coefficient per every domain of definition are obtained. In the examples shown in FIG. 2, within the domain of definition $X_1$-$X_2$ a straight line $B_1$ $B_2$ is represented as the following function, that is;

$$a_1 X + b_1 Y = c_1 \quad (1)$$

and a straight line $B_2$ $B_3$ can be represented as the following function, $$a_2 X + b_2 Y = c_2 \quad (2)$$

$X_1$, $X_2$ are substituted respectively for X of each of formulas (1) and (2) to obtain Y coordinate values in the both formulas (1) and (2). Since the value obtained from formula (1) is small, formula (1) is the starting function and formula (2) is the finishing function. As they are both straight lines between two points respectively, the former, i.e., the starting function code is designated to be "0 1", and the finishing function is designated to be "1 1". Logarithm of the function is [0 1]. Between domain of definition $X_2$-$X_3$, the straight line $B_1$ $B_5$ is represented by the following formula;

$$a_5 X + b_5 Y = c_5 \quad (5)$$

Since the straight line $B_2$ $B_3$ is represented by formula (2), Y coordinate values of formulas (5) and (2) are obtained by substituting $X_2$, $X_3$ to formulas (5) and (2), respectively. Then, comparing the obtained Y coordinate values with each other, it is determined that formula (5) represents the starting function and formula (2) represents the finishing function.

As described the above, at first a pair of functions are obtained, and then the starting function code, starting function coefficient code, the finishing code and finishing function coefficient are obtained. Next, within the domain of definition $X_3$-$X_4$, the straight line $B_3$ $B_4$ is represented by formula (5), and the straight line $B_4$ $B_5$ is represented by the following formula, that is;

$$a_4 X + b_4 X = c_4 \quad (4)$$

and the straight line $B_3$ $B_4$ is represented as follows;

$$a_3 X + B_3 Y = C_3 \quad (3)$$

and further the straight line $B_2$ $B_3$ is represented by formula (2). By comparing each of Y coordinate values obtained by substituting $X_3$, $X_4$ for X in formulas (5), (4), (3) and (2) with one other, if they are aligned in smaller order of the values, they become starting function, finishing function, starting function, finishing function and the number of pair of functions are [2] so that [0 2] is obtained. As same as the above described, with the domain of definition $X_4$-$X_5$, formula (3) is starting function and formula (2) becomes finishing function. The number of pair function is [1].

As above described, after having been obtained code, coefficient and logarithm with respect to one closed contour, as shown in Table 1, picture image and color designation code (as the contour L shown in FIG. 2 is a picture, so that [0 1]) are entered to Table 1, as a percent value of tint screen [0] is written, and as the leading address of pair function is determined, Table 1 is filled by the address sequentially. Within the domain of definition $X_4$-$X_5$, there is no data of pair function, so that in the leading address of pair function F F F F H is written. According to the afore-mentioned, according to this, the leading address (in the case shown in FIG. 2, 10 A B H) is input.

At step $S_5$, whether all the contour of which preferential degrees are designated are obtained or not is judged. In the examples shown in FIG. 2, no condition has been obtained yet regarding the contour M, so that it is judged as [NO].

At step $S_7$, the following contour is designated. In the examples shown in FIG. 2, description is given regarding the contour M. With respect to the contour M, description will be advanced according to Table 1. At the step $S_4$, the contour M is a circle, and a radius of the circle is obtained from the central point $D_c(a,b)$ and a point $D_r(a',b')$ on the circumference according to the following formula;

$$r = \sqrt{(a - a')^2 + (b - b')^2} \quad (5)$$

From the formula which represent a circle, $$y = \sqrt{r^2 - (x-a)^2} + (-b) \quad (6)$$

is the starting function and $$y = \sqrt{r^2 - (x-a)^2} + b \quad (7)$$

is the finishing function.

Domains of definition $X_5$ and $X_7$ are calculated as follows:

$$X_5 = a - r \quad (8)$$

$$X_7 = a + r \quad (9)$$

As the starting function code [0 2] is set up and as the finishing function code [1 2] is set up. The number of pair function in the domain of definition is 1, and there is no sequent pair function in the domain of definition, so that to the next address of the pair function F F F F H is input. An ink % value $50_{10}$ (decimal notation) of YMCK is 32H (sexadecimal notation). As the tint screen is applied, picture color designation code [0] is entered.

At the step $S_5$, the whole contour of which preferential degree is designated has been obtained, so that judgement becomes YES. At step $S_8$, since there is not a third contour, to the leading address of the next function table F F F F H is input. At step $S_{10}$, the preferential degree is lowered by one rank, and the second preferential degree.

At step $S_{11}$, the contour N is secondly ranked preferential degree, so that judgement is YES, and returns to the step $S_5$. In the steps $S_4$–$S_5$, as mentioned above, operation is carried out, and since the contour N is a rectangle, results are as shown in Table 2. At the step S, preferential degree is thirdly ranked. At the step $S_{10}$, there is not contour of thirdly ranked preferential degree, accordingly, judgement becomes [NO].

TABLE 1

|  |  |  | RAM address |
| --- | --- | --- | --- |
| Preferential Degree 1 The First Contour Function Table | The leading address of the next function table | 10, AB | $1000^H$ |
|  | Picture, color designated code | 01 | 1002 |
|  | Y, M, C, K tint screen % value | 0, 0, 0, 0 | 1003 |
| Contour Function Table 1 | The leading address of the next pair function | 10, 28 | 1007 |
|  | Domain of definition $X_S, X_E$ | $X_1, X_2$ (2 byte, respectively) | 1009 |
|  | Pair function in the range of domain of definition | 01 | 100D |
| Pair function 1 | Starting function code | 01 | 100E |
|  | Starting function coefficient | $a_1, b_1, c_1$ (4 byte, respectively) | 100F |
|  | Finishing function code | 11 | 101B |
|  | Finishing function coefficient | $a_2, b_2, c_2$ | 101C |
| Contour Table 1 | The leading address of the next pair function | 10, 49 | $1028^H$ |
|  | Domain of definition $X_S, X_E$ | $X_2, X_3$ | 102A |
|  | Pair function in the range of domain of definition | 01 | 102E |
| Pair Function 2 | Starting function code | 01 | 102F |
|  | Starting function coefficient | $a_5, b_5, c_5$ | 1030 |
|  | Finishing function code | 11 | 103C |
|  | Finishing function coefficient | $a_2, b_2, c_2$ | 103D |
|  | The leading address of the next pair function | 10, 8A | $1049^H$ |
|  | Domain of definition $X_S, X_E$ | $X_3, X_4$ | 104B |
|  | The number of pair function in the range of domain of definition | 02 | 104F |
| Pair Function 3 | Starting function code | 01 | 1050 |
|  | Starting function coefficient | $a_5, b_5, c_5$ | 1051 |
|  | Finishing function code | 11 | 105D |
|  | Finishing function coefficient | $a_4, b_4, c_4$ | 105E |
| Pair Function 4 | Starting function code | 01 | 106A |
|  | Starting function coefficient | $a_3, b_3, c_3$ | 106B |
|  | Finishing function code | 11 | 1077 |
|  | Finishing function coefficient | $a_2, b_2, c_2$ | 1078 |

TABLE 1-continued

| | | | RAM address |
|---|---|---|---|
| Contour Function Table 1 | The leading address of the next pair function | FF, FF | $108A^H$ |
| | Domain of definition $X_S, X_E$ | $X_4, X_6$ | |
| | Pair function in the range of domain of definition | 01 | |
| Pair Function 5 | Starting function code | 01 | |
| | Starting function coefficient | $a_3, b_3, c_3$ | |
| | Finishing function code | 11 | |
| | Finishing function coefficient | $a_2, b_2, c_2$ | |
| The Second Contour Function Table | The leading address of the next pair function | FF, FF | $10AB^H$ |
| | Picture, color designated code | 0 | |
| | Y, M, C, K ink % value | 32, 32, 32, 32 | |
| Contour Function Table 1 | The leading address of the next pair function | FF, FF | |
| | Domain of definition $X_S, X_E$ | $X_5, X_7$ | |
| | Pair function in the range of domain of definition | 01 | |
| Pair Function 6 | Starting function code | 02 | |
| | Starting function coefficient | a, b, r | |
| | Finishing function code | 12 | |
| | Finishing function coefficient | a, b, r | |

TABLE 2

| Preferential Degree 2 The First Contour Function Table | The leading address of the next pair function | FF, FF | $1000^H$ | |
|---|---|---|---|---|
| | Picture, color designated code | 0 | 1002 | |
| | Y, M, C, K tint screen % value | 05, 05, 05, 05 | 1003 | |
| Contour Function Table 1 | The leading address of the next pair function | FF, FF | 1007 | |
| | Domain of definition $X_S, X_E$ | $X_0, X_8$ | 1009 | $7^H$ |
| | Pair function in the range of domain of definition | 01 | 100D | |
| Pair function 1 | Starting function code | 01 | 100D | |
| | Starting function coefficient | 01 $Y_0$ | 100F | |
| | Finishing function code | 11 | 101B | $1A^H$ |
| | Finishing function coefficient | 01 $Y_5$ | 101C | |

At the step $S_{12}$, it is judged whether or not there are any lower ranked preferential degrees, and if there are any, it returns to the previous step $S_{10}$ and enters to the afore mentioned flow. If there is no lower ranked preferential degree, the flow advances to the next step. At step $S_{13}$, the contents of Tables 1 and 2 obtained by the above described flow are transferred to CPUs 16, 16' and 16" according to their preferential degrees, respectively. After the transfer has finished, data of the next block copy base paper can be input to the preset part. The preset part 38 inputs and scans the original picture on the original picture cylinder, and controls the motor control means 42 and 43 so that they may output and scan a rectangle $C_1 C_2 C_3 C_4$ which envelops the picture and the contour L. The preset part 38 is, as having been already disclosed in the specification of the Japanese Patent Application No. 58-168861 filed by the very Applicant, provided with a plurality of CPUs. Of course, it may be adapted that each of the plurality of CPUs controls necessary operation, respectively.

Next, description will be given to a contour generation part in the block C. When the data shown in Table 1 are input to CPU (16), according to the flow chart shown in FIG. 4, operation regarding a contour to be output begins and the operated data are sent to the control data memory 17. The control data memory 17 is a memory means such as a FIFO. The CPUs 16' and 16" . . . carry out operation according to the rank of the preferential degree, and send each of data to the respective control data memories 17', 17" . . . .

Referring to the contours shown in FIG. 2, the flow chart shown in FIG. 4 will be described hereinafter. The flow chart shown in FIG. 4 is a flow chart for operating CPUs 16' and 16" independently. Detailed description regarding CPU 16 is described hereunder. At step $S_{31}$, and initial value $X_0$ is substituted for x.

Figure 5A:
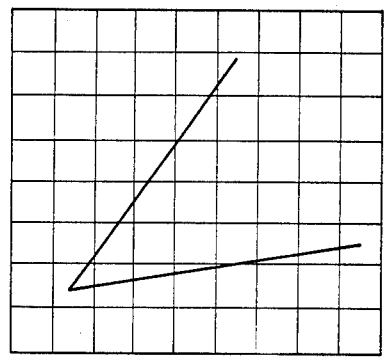
FIG. 5(a) is a coordinate view for illustrating processing in the case of start function coordinate values being equal to finish function coordinate values resulting from a contour coordinates operation.
Figure 5B:
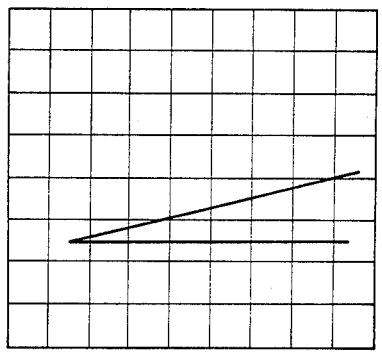
FIG. 5(b) is a coordinate view for illustrating processing in the case of overlapped points being made in the vicinity of the domain of definition of a starting point and a finishing point resulting from a contour coordinates operation.

Here, $X_0$ is an exposure starting line. At step $S_{32}$, from the contour function table (Table 1), domain of definition is read out. At step $S_{33}$, it is judged whether an X coordinates to be exposed is in the range of the domain of definition or not. If it is out of the domain of definition, the flow advances to step $S_{41}$, and if it is in the range of domain of definition, the flow advances to step $S_{34}$. At the step $S_{34}$, an operational formula to be applied is determined from the function code, and by substituting for function coefficients starting coordinates and finishing coordinates values are obtained. If there has been any pair functions still in the range of the domain of definition, starting and finishing coordinates values of the contour are obtained by further substituting function code and function coefficient. Coordinates values are stored to a memory (17-$a$). Further, at the step $S_{34}$, within an identical function table II, that is, in coordinates values within an identical contour, coordinates values obtained from results of the present operation and those of results obtained from operation carried out just before the present operation are compared with each other one after another, and administrate the relation of magnitude between them. This fact means that in the range of the pair function of the starting point $X_S$ or the finishing point $X_E$, there are some cases in which a starting coordinates value and a finishing coordinates value become an identical value (FIG. 5($a$)), reason therefor lies in avoiding inconvenience to have to perform ON/OFF operation of a contour mask on an identical pixel by the coinciding circuit 19. When the operation result of the prior operation becomes an equal value to that of the present operation, that is, when they are an overlapped coordinates point, the present operation results (coordinates value) are increased by one address portion to make a finishing coordinates value and a starting coordinates value. Thus, the above mentioned inconvenience is avoided.

Status to have to carry out overlapping points processing is not only the starting point or the finishing point of the domain of definition of the pair function, but even in the vicinity thereof, such status can be occurred according to contours of shapes. In this case, by increasing the coordinates value obtained by the present operation by one address portion, a contour mask can be generated without hindrance (FIG. 5($b$)). At step $S_{40}$, together with the starting coordinates value an output mask bit which represents a masking area is the starting coordinates value, so that code [1] is input to a selection control memory (17-$c$). 1 or 0 is input to a density memory (17-$b$) and in the case of applying a tint screen by making tint % value which is preliminarily designated of each of color plates as data, 0 or 1 is also input to the density memory (17-$b$). Together with the finishing coordinates values the output mask bit are encoded [0], and all other data make data [0]. The coordinates values, the output mask bit, a picture tint screen bit and the tint % value are recorded to the memory 17 as a set of data for the FIFO.

At the step $S_{41}$, it is ascertained whether there are any other contour tables or not. If it is YES, the flow returns back to the step $S_{32}$. If it is NO, it shifts to the next step. At step $S_{42}$, at contour coordinates values existing on an address x in the present feeding direction obtained from results of operation, it is checked whether sorting is necessary or not. Necessary conditions for sorting are that; more than two contours exist on the address x in the feeding direction, and the address x is the starting point or the finishing point of domain of definition. All addresses except the afore-mentioned x in the feeding direction, since there is no change in appearance order of contour between the previous line (x-1) and the present line (x), if only the appearance order is memorized, no further sorting is necessary. At step $S_{43}$, with respect to contour coordinates values on the address x in the feeding direction, sorting is carried out in order of smaller Y coordinates value. There has been already established the relation that the starting coordinates value is smaller than the finishing coordinates value (the starting coordinates value the finishing coordinates value), so that if attention is not paid to all contour coordinates values on the address x in the feeding direction which satisfy the above described sorting conditions, by paying attention only to either the starting coordinates values or the finishing coordinates value, Y coordinates values are aligned in smaller order thereof.

At step $S_{44}$, end data are made up. The end data are the maximum $Y_e$ of Y address at the finishing coordinates value, the output mask bit [0] and all of the rest data [0]. At step $S_{45}$, it is ascertained whether the control data memory 17 is completely filled with data or not. If it is completely filled, the flow advances to step $S_{47}$, and if not filled, then flow advances to step $S_{46}$. At the step $S_{46}$, coordinate data having been made up are transferred to the control data memory 17. At the step $S_{47}$, it is checked whether exposure recording is begun or not, and if it is not begun yet, at step $S_{48}$, exposure is begun according to instructions from the preset part 38. At step $S_{49}$, it is judged whether operation of the whole contour has been completely ended or not. If it has not still ended, the flow advances to step $S_{45'}$, and if it has ended, operation is completely ended. At the time when a blank area is made in the control data memory 17, the flow advances to step $S_{50}$, and by increasing the address x in the feeding direction, the flow returns back to step $S_{32}$ for commencing operation of contour coordinates of the next recording line.

Limiting the above described operation only to CPU 16, as shown in FIG. 2, between address x is between coordinates values of $X_0$ to $X_1-1$ only the step $S_{44}$ effectively operates, and only the end data are made up. (Table 3(b)). When address x is $X_1$, at the step $S_{44}$ the starting coordinates value $Y_5$ is $Y_2$, and the finishing coordinates value $Y_E$ is same as that of the starting coordinates value $Y_2$.

Accordingly, because of the above described reason, the overlapping points processing is performed, and the finishing coordinates value $Y_E$ is made to $Y_2+1$. Next, the flow shifts to the step $S_{40}$, and attributive data of the starting coordinates value $Y_2$ and the finishing coordinates $Y_2+1$ are made up. At the starting coordinates value $Y_2$, the output contour mask bit and picture and tint laying selection bit are [1], and tint screen ink % value of each of Y, M, C and K is [0]. Further, at the finishing coordinates value $Y_2+1$, the above described all attributive data become [0]. When operation regarding the contour L at the steps $S_{32}$–$S_{40}$ and making up of the attributive data end, CPU 16 checks, at the step $S_{41}$, regarding the next contour function table II, that is, whether there are any other contours or not (Table 1). In this case, since there exists the contour function table II regarding the contour M, the flow returns back to the step $S_{32}$, and reads out the domain of definition of the pair function 1 of the contour M. It is judged that the address $x=X_1$ in the present feeding direction is out of the rage of the domain of definition of the contour M by the step $S_{33}$, so that again the flow shifts to the step $S_{41}$, where it is checked whether there exist any other contours or not. If it is ascertained that there is no contour, the flow advances to the step $S_{42}$, and there it is checked whether sorting is necessary or not. On the address $x=X_1$ in the feeding direction, there is only one pair of contour function coordinates values, so that no sorting is necessary.

At the step $S_{44}$, printing end coordinates and attributive data thereof are made. The print end coordinates value is $Y_e$, and the output contour mask bit which is the attributive data, picture and/or tint laying selection bit and tint screen ink % value are all [0]. As mentioned the above, the starting coordinates $Y_2$, the finishing coordinate $Y_2+1$, the print finishing coordinates $Y_e$ and their attributive data are made up, and thus, making up coordinates data at the address $x=X_1$ in the feeding direction ends.

At the step $S_{45}$, it is checked whether there is a blank area which exists in the FIFO (pre-input, pre-output) type control data memory 17 or not, and whether the afore-described coordinates data can be loaded or not. When it is judged that no load can be performed, the flow advances to a the step $S_{47}$, and when load can be done, after loading the coordiantes data to the FIFO type control data memory 17, the flow advances to the step $S_{45}$. At the step S, it is checked whether exposure recording is commenced or not, and if exposure recording has been commenced, the flow advances to the step $S_{47}$, and if exposure recording has not commenced, at the step $S_{47}$, after having output an exposure recording commencing O.K. signal to the preset part 38, according to instructions from the preset part 38, exposure recording is commenced, and the flow advances to the step $S_{49}$. Further, at the step $S_{49}$, it is checked whether the address x exceeds its maximum value $X_{MAX}$ or not, and if it exceeds the maximum value, operation completely ends.

Now, since the address x in the feeding direction is $X_1$, the flow advances to the step $S_{45'}$ and again monitors whether a blank area is made in the FIFO (pre-input, pre-output) type control data memory 17. While the control data memory 17 is filled with data, the step $S_{45'}$ is looped. When a blank area is made in the control data memory, at step $S_{50}$ the address x in the feeding direction is increased, and in order to load new data in the blank area the flow returns back to the step $S_{32}$, coordinates value operation of a contour existing on the address x is commenced.

According to the above described operation, up to value of address x from $X_1$ to $X_2-1$, with respect to the contour L, the starting function coordinates values represented by a line $B_1 B_2$ obtained by the pair function 1 (refer to Table 1) in the contour function table II, the finishing function coordinates values represented by a line $B_2 B_3$, printing end coordinates values and attributive data of those coordinates values are made up, and they are loaded in the control data memory 17 one after another.

When the address x in the feeding direction becomes $X_2$, CPU 16 finishes reference of the pair function 1 regarding the contour L, next, calculates contour coordinates values from function coefficient, and by adding the print finishing coordinates value, together with the above described attributive data the coordiantes data are loaded in the control data memory 17. The above described processing are repeated value of the address x from $x_2$ to $X_9-1$ in the feeding direction. When the address x in the feeding direction becomes $X_3$, reference to the pair function 2 is ended, and refers to the next pair function data. At this time different from the prior case, in the range of the domain of definition $X_3 \leq X < x_4$, there exist two pair functions, that is, there exist pair functions 3 and 4. In this case at the step $S_{34}$, it means that two pairs of contour coordinates values are operated. At first the starting function coordinates value and the finishing function coordinates value of the pair function 3 are operated, and then calculation of the starting function coordinates value of the pair function 4 are executed. Here, the finishing coordinates values of the pair function 3 and the starting coordinates values of the pair function 4 are overlapped at the point $B_4$ (FIG. 2), and the overlapped points are processed by the above described overlapped points processing. Thus, the starting coordinates value of the pair function 4 is incremented by one. Then, the finishing coordiantes value is calculated, and the flow advances to the step $S_{40}$, and coordinates data are made up by the same procedure mentioned above. Thereafter, from values of $X_3+1$ to $X_4-1$ of the address x in the feeding direction, as same as the case of the address $x=X_3$, two pairs of coordinates values of the starting function and the finishing function, print finishing coordiantes value and attributive data thereof are made, and sequentially loaded in the control data memory 17.

When the address x in the feeding direction becomes $X_4$, CPU 16 completes referring to the pair functions 3 and 4, and next reads out function codes and function coefficients of a pair function 5 to make up coordiantes data. After then, values from $X_4+1$ to $X_5-1$ of address x in the feeding direction quite same operation continues.

When address x in the feeding direction becomes $X_5$, CPU 16 makes up starting coordinates values, finishing coordinates values and their attributive data, and next at the step $X_{32}$ domain of definition of the pair function 1 of the contour M are read out. At the step $S_{33}$ address $X_5$ in the feeding direction is the starting point of the domain of definition of the pair function 1, so that at the step $S_{34}$ the function code and the function coefficient are read out and operation of contour coordinates of a circle in carried out.

After having obtained the starting and the finishing functions coordiantes values of the contour M, since there are two contours at the step $S_{40}$, it is judged that sorting is necessary. At the step $S_{42}$, with respect to two pairs of contour coordinates values of the starting function and the finishing coordinates values of the contour L and those of the contour M, sorting (re-aligning) in order of smaller values is executed.

Hereunder, by means of the same procedures the coordinates data at the address x in the feeding direction are loaded in the control data memory 17. Within values of the address x in the feeding direction being from $X_5+1$ to $X_6-1$, same as the above described, coordinates data of the contour L obtained from the pair function 5, coordinates data of the contour M and coordinates data of print finishing coordinates are made up. However, in the range of the above described section (from $X_5+1$ to $X_6-$), sorting is not executed, but by applying results of sorting at a value $x=X_5$ of the address x in the feeding direction, the coordinates values are re-aligned in smaller order thereof.

In Table 3(a) there are shown coordinates data of the contour L and the contour M at values $x=(X_5 \leq 1 < X_6)$ of address x in the feeding direction. In Table 3(b) there are shown coordinates data at print finishing coordinates which are made up whenever the address x in the feeding direction is incremented (step S44). When the address x in the feeding direction reaches X5, CPU 16 finishes (ends) operation of all the pair functions in the contour L. Therefore, the address x in the feeding direction is between values X6 and X7+1, only the coordinates data of the contour M and the coordiantes data of the print finishing coordinates are made up.

When the address x in the feeding direction becomes X7, CPU 16 ceases to make up coordinates data in the contour M, and after then till value of the address x in the feeding direction becomes X8, it (CPU 16) makes up only coordinates data of print finishing coordinates of the step S44. When address x in the feeding direction reaches to X8, at the step S49 it judges that no coordinates data after then is necessary, and ends operation in the CPU 16.

TABLE 3(a)

| Starting & Finishing Coordinate Value | Yellow Ink % Value | Magenta Ink % Value | Cyan Ink % Value | Black Ink % Value | Attributive data |
|---|---|---|---|---|---|
| $Y_1$ | 0 | 0 | 0 | 0 | 3 |
| $Y_2$ | 0 | 0 | 0 | 0 | 0 |
| $Y_3$ | 32 | 32 | 32 | 32 | 1 |
| $Y_4$ | 0 | 0 | 0 | 0 | 0 |

TABLE 3(b)

| Coordinate Value | Yellow Ink % Value | Magenta Ink % Value | Cyan Ink % Value | Black Ink % Value | Attributive data |
|---|---|---|---|---|---|
| $Y_e$ | 0 | 0 | 0 | 0 | 0 |

In CPU 16', as same as the above described, according to the flow chart shown in FIG. 4, from a function table of the contours in Table 3(b) the contour N (background) is generated.

Operation of Block C (FIG. 1):

Hereunder, operating manners of a circuit of the block C according to the coordinates data made up the above mentioned procedures will be explained. The coordinates data are data which are obtained by being compressed at every recording line, and contour coordinates values are loaded in the coordinates memory (17-a), and ink density value is loaded in the density memory (17-b) and attributive data are loaded in the selection control memory (17-c).

When exposure recording is commenced, output coordinates values of the coordinates memory (17-a) are compared one after another with output values of the Y coordinates counter 38 of the recording part by the coinciding circuit 19. When both output values are coincided with each other, an equal pulse is output from the coinciding circuit 19. By this pulse information regarding density and that of selection control after these coordinates values are latched to latch means LA1 20, LB1 21 and LC1 22, respectively, and the output coordinates values of the coordinates memory (17-a) is renewed by the equal pulse of the coinciding circuit 19, and again the renewed coordinates value is compared with the output value of the Y coordinates counter 36.

An output of the latch means LC1 22 is a picture and/or tint laying selection information, and by this signal either an output of the latch means LB1 21, an ink % value or an output of the memory means 14, reproduced picture image information to be selected is decided, and when the output (contour mask information MSK 1) of the latch LA1 20 is ON, the output of the data selector 18 is fed to the dot generator 37 through the buffer 23. The dot generator (37) is a circuit part which converts density data into halftone dot pattern for printing.

As mentioned the above, as shown in FIG. 2 ranking of the preferential degrees of the contour L, the contour M and the contour N is as follows; that is, contour L=contour M>contour N That is, ranking of the preferential degrees of the contour L and the contour M is the same, and that of the contour N is lower than those of the contours L and M. If the above described conditions are corresponded to hardware of the block C shown in FIG. 1, the contour function table(s) relating to the contour L and the contour M is fed from the reset part 38 to CPU 16, and processing such as operation etc. of the contour coordinates are carried out by CPU 16 as mentioned the above, and the result(s) is stored in the control data memory 17.

Since ranking of the preferential degree of the contour N (background) is lower those of the contours L and M, the contour function table is sent to CPU 16' from the preset part (38). Just as described above, processing such as operation of the contour coordinates by CPU 16' are carried out The results are stored in the data memory 17'. In FIG. 2, there exists no contour of which ranking of preferential degree is lower than the contour N, so that in this case CPU 16" does not carry out any processings.

When scanning of the picture scanning recording machine is begun, the coordinates values of the contour L and the contour M are compared with the value of the Y coordinates counter 36 in the coinciding circuit 19, and at the time when both of the values coincide with each other, contents of the density memory (17-b) corresponding to the coordinates values and those of the selection control memory (17-c) are latched in the latches LA1 20, LB1 21 and LC1 22. The fact that when the MSK1 signal is in ON state, after either an ink % value of tint screen or information of the reproduced picture image has been selected by the data selector 18, the data are sent to the dot generator 37 through the buffer 23 as has been already described. With respect to the contour N (background), quite same operation as the above mentioned is carried out in the control data memory 17', the coinciding circuit 19', latches LA2 20', LB2 21', LC1 22', a data selector 18' and a buffer 23'. However, when the MSK1 signal is in ON state, even an MSK2 signal is in ON state, the buffer 23' is disabled by the gate circuit 24. In brief, when a mask signal of the contour of which ranking of the preferential degree is high is in ON state, information of picture images within contours of which ranking so preferential degrees are lower than that of the former are not output.

In FIG. 6 conditions of the MSK1 signal, a MSK2 signal and picture image information fed to the dot generator 37 at an imaginary recording line x=1 shown in FIG. 2 are illustrated. Thus, processing of contours different in their ranking of preferential degrees are easily performed by adding the same number of compact hardwares having the same constructions as that of the ranking of the preferential degrees.

Inlaying pictures in the contour L:

A reproduced picture image(s) of an original picture (ORI1) picked up at the inputting part (Block B shown in FIG. 1) of the picture scanning recording machine is to be inlaid into the contour L shown in FIG. 2. A method therefor will be described hereunder.

Construction and operation of the inputting part (Block A shown in FIG. 1) and the recording part (Block B shown in FIG. 1) of the picture scanning recording machine are as described above.

Figure 7:
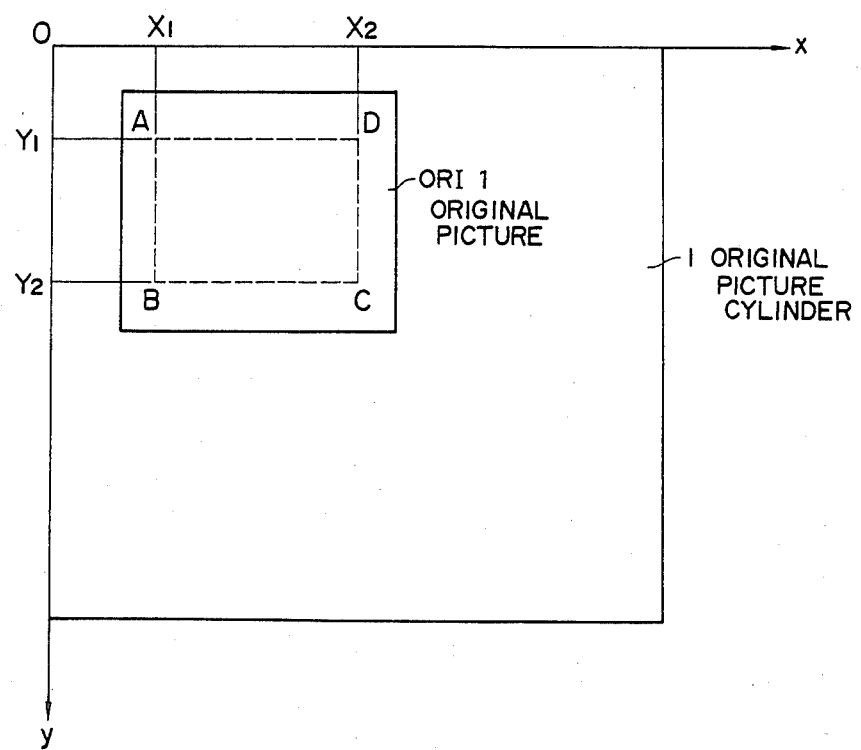
FIG. 7 is a view showing original pictures being stuck onto an original cylinder for illustrating a method for fitting a reproduced picture into a contour L shown in FIG. 2.

The recording head 30 begins exposure recording, and when the exposure recording operation reaches at by 1 line prior to the picture image trimming starting coordinates X (FIG. 2), the trimming mask signal generating means 12 sends a picture data writing enable signal to the layout memory control means 15. In FIG. 7 there are shown the original picture (ORI1) to be output to the contour L wound on the original picture cylinder 1 and a trimming area ABCD of the input part which corresponds to the trimming area $C_1 C_2 C_3 C_4$ of the recording part shown in FIG. 2.

The picture data writing enable signal is in the ON state between $Y_1 \leq Y < Y_2$ in the scanning direction and in the range of $X_1 \leq X < X_2$ shown in FIG. 7. Accordingly, to the memory 14 not all the picture data of the input side is written, but only the picture data in the trimming area ABCD (FIG. 7) of the original picture (ORI1) is written.

When the recording head 30 comes to the picture image trimming starting coordinates $X_9$ shown in FIG. 2, the trimming mask generating means 41 of the recording side sends a picture data reading enable signal to the layout memory control means 15. Depending on the above described, the picture image data written in the memory means 14 are read out sequentially according to the trimming areas $C_1 C_2 C_3 C_4$ (FIG. 2) of the recording part, and through the data selector 18 they are fed to the buffer 23.

On the other hand the buffer 23 is controlled by the MSK1 signal which is an ON/OFF signal of the contour. Thus, the picture data of the original picture (ORI1) fed to the dot generator 37 are limited to the inside of the contour L, and are exposed on an output film through the recording head 30. Thus, inlaying the pictures in the inside of the contour L is completed. Here, attention should be paid to the fact that this picture scanning recording machine prints the original picture (ORI1) wound onto the original picture cylinder on the output film in real time. For this reason the scanning head 4 must move so that it may pick up picture information at the trimming starting position $X_1$ of the original picture (ORI1) at least one line before the recording head 30 reaches at a reproduced picture image output starting position $X_9$ (FIG. 2). The movement of the scanning head 4 as mentioned above has already scheduled in the preset part prior to starting of scanning operation, and the information is set in the motor control means 42. In addition, input part trimming areas $(X_1, Y_1)$, $(X_2, Y_2)$ (FIG. 7) set to the trimming mask generating means 12 of the input part and recording part rimming areas $(X_9, Y_6)$, $(X_{10}, Y_7)$ (FIG. 2) set to the trimming mask generating means of the recording part are set up to the respective means from the preset part 38 sufficiently prior to commence picking up the original picture (ORI1).

Making up free contour coordinates data:

All the contours to which reproduced picture images or a tint screen having been described heretofore are definite contours (such as circle, ellipse, contours which can be represented by general linear function etc.). However, even with respect to any free contours (for example, polygons having so many angles) which are difficult to express in the form of functions which can be input from the digitizer 40 in run mode, the processing carried out in CPU 16 regarding the definite shaped contour, that is, the processing in which contour coordinates data to be loaded in the control data memory 17 are made up, is performed at the preset part 38, and thus, said made up data can be output on the output film with the same hardware.

One example of methods for processing a free contour at the preset part 38 is described hereunder.

Figure 8:
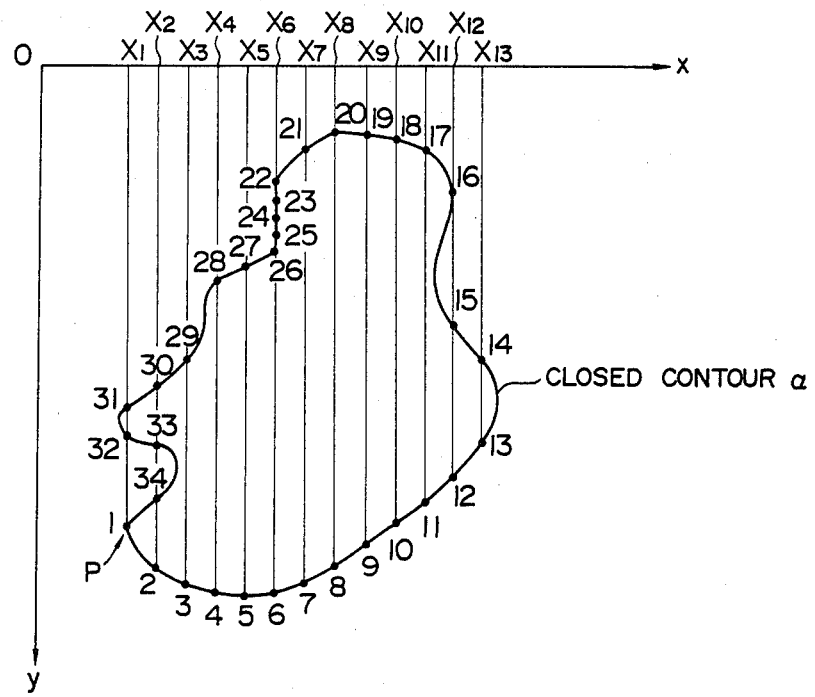
FIG. 8 is a coordinate view for explaining a practical manner for forming a free contour coordinate table.

There is shown one example of a free contour having been input from the digitizer 40 in FIG. 8. However, here, it is assumed that coordiantes system on the digitizer 40 has already been converted to that of on the output film. In this example, firstly designated point P by a cursor is the point 1, and after then, points extracted on a closed contour $a$ according to movement of the cursor are from 2 to 34. From a coordinates data table $\beta$ of the closed contour shown in Table 4, a contour coordiantes table which re-aligned according to the recording scanning order represented in Table 5 is obtained, for example, for following procedures.

With respect to the coordinates data table $\beta$ of Table 4, to facilitate detection of overlapped points which will be carried out, adjacent contour coordinates points on the identical recording line are compressed as follows. At first, the starting point P (point 1) of the closed contour $a$ is assumed as the present point, and when X coordinates of the next point is coincided with the X coordinates of the present point, coordinate data of the next point are deleted from the table.

Again, comparing X coordinates of the present point with that of the next point (the next point of the deleted point), and if they are coincided with each other, then this point is also deleted from the table, and if they are not coincided with, then the point, that is, the X coordinates of the said next point, is set to be the present point. Thus, the same processing are continued. When the present point reaches to the last coordinates point 34 of the table, X coordinates of the present point is compared with that of the starting point (point 1), and if they are equal, the starting point (point 1) is deleted, and if not, with the states as they are, compression of the table is ended.

| Number | Coordinate Value | Overlapped Flag | Number | Coordinate Value | Overlapped Flag |
| --- | --- | --- | --- | --- | --- |
| 1 | $(X_1, Y_1)$ | 1 | 18 | $(X_{10}, Y_{18})$ | |
| 2 | $(X_2, Y_2)$ | | 19 | $(X_9, Y_{19})$ | |
| 3 | $(X_3, Y_3)$ | | 20 | $(X_8, Y_{20})$ | |
| 4 | $(X_4, Y_4)$ | | 21 | $(X_9, Y_{21})$ | |
| 5 | $(X_5, Y_5)$ | | 22 | $(X_6, Y_{22})$ | |
| 6 | $(X_6, Y_6)$ | | 23 | | |
| 7 | $(X_7, Y_7)$ | | 24 | | |
| 8 | $(X_8, Y_8)$ | | 25 | | |
| 9 | $(X_9, Y_9)$ | | 26 | | |
| 10 | $(X_{10}, Y_{10})$ | | 27 | $(X_5, Y_{27})$ | |
| 11 | $(X_{11}, Y_{11})$ | | 28 | $(X_4, Y_{28})$ | |
| 12 | $(X_{12}, Y_{12})$ | | 29 | $(X_3, Y_{29})$ | |
| 13 | $(X_{13}, Y_{13})$ | | 30 | $(X_2, Y_{30})$ | |
| 14 | | | 31 | $(X_1, Y_{31})$ | |
| 15 | $(X_{12}, Y_{15})$ | | 32 | | |
| 16 | | | 33 | $(X_2, Y_{33})$ | |
| 17 | $(X_{11}, Y_{17})$ | | 34 | | |

TABLE 5

| (1) | (2) | (3) | (4) |
|---|---|---|---|
| $X_1$ | 2 | $Y_{31}$ | $Y_{31} + 1$ |
|  |  | $Y_1$ | $Y_1 + 1$ |
| $X_2$ | 2 | $Y_{30}$ | $Y_{33}$ |
|  |  | $Y_{33} + 1$ | $Y_2$ |
| $X_3$ | 1 | $Y_{29}$ | $Y_3$ |
| $X_4$ | 1 | $Y_{28}$ | $Y_4$ |
| $X_5$ | 1 | $Y_{27}$ | $Y_5$ |
| $X_6$ | 1 | $Y_{22}$ | $Y_6$ |
| $X_7$ | 1 | $Y_{21}$ | $Y_7$ |
| $X_8$ | 1 | $Y_{20}$ | $Y_8$ |
| $X_9$ | 1 | $Y_{19}$ | $Y_9$ |
| $X_{10}$ | 1 | $Y_{18}$ | $Y_{10}$ |
| $X_{11}$ | 1 | $Y_{17}$ | $Y_{11}$ |
| $X_{12}$ | 1 | $Y_{15}$ | $Y_{12}$ |
| $X_{13}$ | 1 | $Y_{13}$ | $Y_{13} + 1$ |

When the present point reaches to the last coordinates point 34 of the table, X coordinates of the present point are compared with that of the starting point P (point 1), and if they are equal, the starting point (point 1) is deleted, and if not, with the states as they are, compression of the table data is ended.

The coordinates points deleted according to the above described procedures are represented by canceling with a cross line on the table 4. From the compressed coordinates table $\beta$ the closed contour coordinates table $\gamma$ re-aligned according to the recording scanning order is obtained by the following procedure. From the starting recording line $X_1$ of the closed contour $\alpha$, each of points of intersection of respective recording lines with the closed contour $\alpha$ is obtained by referring to $\beta$ of the table 4.

With respect to the recording line $X_1$, points 1 and 31 are obtained. Here, though it is necessary to check whether the point 1 and the point 31 are overlapped points or not, it is carried out by comparing an X coordinates value to be checked with X cordinates values of the front and the rear points thereof. In general, a point to be noted is referred to R, and the front coordinates point and the rear coordinates point of the point R on the table $\beta$ are termed to be Q, S, and each of X coordinates values are determined as $X_q$, $X_s$, respectively. Then, by comparing them with the X coordinates value $X_r$, if either of the following conditions is satisfied, the point R is contacting with the recording line $X_r$, that is, it is judged that they are overlapped points.

condition (i) $X_r < X_q$ and $X_r < X_s$ condition (ii) $X_r > X_q$ and $X_r > X_s$ When the point R is the overlapped points, regarding contour starting coordiantes values ($X_r$, $Y_r$), by newly setting up contour finishing coordinates values ($X_r$, $Y_r+1$), overlapping points processing are carried out. After then, by performing the same procedures to all recording lines in the range of contour domain of definition $X_1 \leq X \leq X_{13}$, the coordinates data table $\gamma$ is completed. The ink % information and the attributive data in the inside of the contour shown in the table 3(a), and the print finishing coordinates data on the table 3(b) are inserted into the coordinates data table as the last data of each of the recording lines. By sequentially loading the data to the control data memory 17, as in the case of the definite contour, the free contour can be printed on a desired position of the output film.

When a plurality of picture contours on the main recording scanning line 1 line shown in FIG. 2).

Lastly, referring to FIG. 2, descriptions are given hereinafter regarding a method for controlling setting reproduced picture images not only in the contour L but also in the contour M. In this case for the purpose of performing next two exposure recording operation, the recording head performs only one returning movement.

1. Printing tint screen in the contour L, printing a picture(s) in the inside of the contour M and prohibition of printing in the inside of the contour M (exposure OFF).
2. Printing a picture in the inside of the contour M an prohibition of printing out of the contour M. Hereunder, regarding operation a and 2 detailed description are given.

Figure 9:
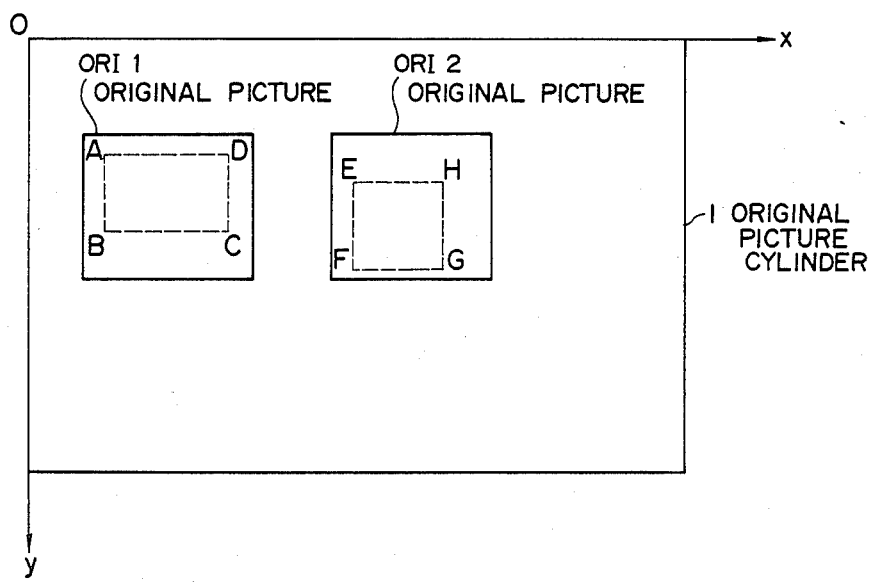
FIG. 9 is a view showing original pictures being stuck on the original cylinder for illustrating a method for fitting reproduced pictures onto the contours L and M shown in FIG. 2.

The original picture (ORI1) set in the contour L and the other original picture (ORI2) set in the contour M are stuck on the original picture cylinder (1) as shown in FIG. 9. That CPU 16 prints the reproduced picture of the original picture (ORI1) in the contour L, CPU 16' generates the contour N and processing of tint layering is performed in the inside thereof is as described the above.

When the reproduced picture image of the original picture (ORI1) is output in the contour L, the scanning head 4 is passing the input trimming area ABCD of the original picture (ORI1) shown in FIG. 9. But the recording head 30 is in the inside of the domain of definition in X direction of the contour M, so that the reproduced picture image of the original picture (ORI2) can not be set in the contour M.

Accordingly, in the contour M processing in which no exposing operation is carried out, that is, as a contour of each of color inks Y, M, C and K, respective ink % values thereof is set as 0%, and thus the first exposure record printing operation is finished. Next, in order to expose the reproduced picture image of the original picture (ORI2) in the contour M, the scanning head 4 is moved just prior to the input trimming area EFGH of the other original picture (ORI2) shown in FIG. 9, and the recording head 30 is returned back just prior to the recording line $X_5$ shown in FIG. 2. Thus scanning is again commenced.

When the recording head 30 reaches to the recording line $X_5$, so that the reproduced picture image information of the original picture(s) to be printed on the output film may be just read out of the layout memory means 14, the feeding motor 5 of the inputting side and the feeding motor 31 of the recording side are controlled. Even in this second exposing operation, as same as in the first case, coordinates data of the contour M corresponding to each of the recording lines are generated, however, in this time only the reproduced picture of the second original picture (ORI2) is exposed in the contour M, but out of the area no printing operation should be carried out.

The second control data are made up based on the first control data at the preset part 38, and data necessary for processing in hardware, such as contour coordinates operation, ink % value, attributive data etc. are loaded sequentially in the control data memory 17 until the second exposing operation is commenced in CPU 16.

In the above descriptions, an example in which two reproduced picture images of the original picture exist on the identical recording line is taken. In general even if there exist N reproduced picture images on the identical recording line, with the quite same procedures as that of the above described, the reproduced picture images completely layouted can be obtained. That is, by returning back the recording head N times, considering each of contours of the N sheets of the reproduced picture images of the original picture, each of the reproduced picture images is exposed one by one. Then, at the first exposing operation one of the reproduced picture images of the original picture and background thereof (in the case shown in FIG. 2, it is the contour M) are exposed, and in other picture contours it is adapted that no exposure is carried out. With respect to other reproduced picture images to be exposed after the second exposing operation, only an associating contour with the picture image is exposed, and in other contours no exposure is performed.

According to the above described method, as aforementioned, when there exist N kinds of contours for reproduced picture images on the identical recording line, the recording head 30 must be turned back N−1 times. Here, it is possible to provide two or more than two (n) picture input scanning means shown in the block A in FIG. 1, and add the number of input channels of the data selector 18 same number as that of the picture image input scanning means having been provided. Thus, it is possible to speed up processing by reducing the number of returning back times of the recording head by multiplexing one of the data from n+1 sets of data channels.

If the above described method is applied, when there exist reproduced picture images the number of N which is larger than that of the picture input means (n) on the identical recording line, the scanning head and the recording head are returned back at maximum [N n] times (here, [ ] is Gaussian code; that is, in the case of $p \leq x < p+1$, $[x]=p$ (here, p is integer)) to carry out exposure recording operation, it is possible to obtain a page of reproduced pictures in which reproduced picture images have been completed their layout.

As described above, according to the present invention, on coordinates areas of a recording film, desired recording picture areas are trimmed freely by definite contours such as circle, ellipse, polygons etc. and by sectional lines of free contours except the aforedescribed definite contours. And the layout configuration completed by disposing thus trimmed recording picture areas to the corresponding coordinates areas freely is recorded as reproduced picture images as they are in real time, and it is also possible to easily carry out preferential processing of the reproduced picture areas etc., and further color designation of background or tint laying processing to other masked portions can be achieved.

In addition, the hardware carrying out the present invention is a quite compact circuit and enables high speed processing of picture signals, and further facilities realtime processing, thereby working time necessary for reproducing picture in case of complicate layout processing being needed can be widely reduced.

In addition, prefernetial processing of recording areas etc. are performed by hardware, so that complicated software is not necessary.

What is claimed is:

1. A method for reproducing picture images in which a plurality of original pictures scanned appropriately by more than two picture scanning input means are recorded on a recording surface of a picture scanning recording machine according to a predetermined layout, comprising the steps of:
    inputting data regarding configurations and dispositions of more than one closed contour in accordance with said predetermined layout on said recording surface of the picture scanning recording machine and data regarding pictures to be recorded inside said closed contours by a data inputting means;
    converting said input data regarding said configurations and said dispositions of said closed contours into closed contour data which are rearranged in order of having been recorded on the recording surface of said picture scanning recording machine;
    storing these data together with data regarding pictures to be recorded in the insides of said closed contours by memory means;
    reading said two kinds of recorded data out of said data memory means according to the order of their having been recorded on the recording surface of said picture scanning recording machine; and
    recording a picture signal or a tint screen which is output from said picture scanning input means in accordance with these data in the inside of more than one closed contour;
    wherein in the case where said closed contours are represented by a function, data are input to said picture scanning recording machine in accordance with the order required by the function, and said input data are converted into closed contour data in the order of their having been recorded on the recording surface of said picture scanning recording machine.

2. A method for reproducing picture images according to claim 1, wherein said data regarding said pictures to be recorded in the inside of said closed contours include data of picture patterns, selection data of tint screens to be recorded, and as occasion demand, data of preferential degrees of these picture patterns and tint screens, and data regarding size of halftone dot of said tint screen, and wherein said contour data represented by a function is operated on during output scanning.

3. A method for reproducing picture images according to claim 1 or 2, wherein when said closed contour is a free contour, coordinates values of a plurality of points on said contour are input to said picture scanning recording machine by said input means, and said input data are converted into closed contour data in accordance with the order of their having been recorded on the recording surface of said picture scanning recording machine.

* * * * *